(12) United States Patent
Franchet et al.

(10) Patent No.: US 9,085,818 B2
(45) Date of Patent: Jul. 21, 2015

(54) METHOD FOR MANUFACTURING A STRAIGHT INSERT MADE OF METAL MATRIX COMPOSITE MATERIAL

(75) Inventors: Jean-Michel Patrick Maurice Franchet, Paris (FR); Gilles Charles Casimir Klein, Mery sur Oise (FR); Richard Masson, Buc (FR); Louis Salvat, Tignieu Jameyzieu (FR)

(73) Assignees: SNECMA, Paris (FR); MESSIER-BUGATTI-DOWTY, Velizy Villacoublay (FR)

( * ) Notice: Subject to any disclaimer, the term of this patent is extended or adjusted under 35 U.S.C. 154(b) by 427 days.

(21) Appl. No.: 13/512,447

(22) PCT Filed: Dec. 15, 2010

(86) PCT No.: PCT/EP2010/069738
§ 371 (c)(1),
(2), (4) Date: May 29, 2012

(87) PCT Pub. No.: WO2011/073247
PCT Pub. Date: Jun. 23, 2011

(65) Prior Publication Data
US 2012/0234431 A1 Sep. 20, 2012

(30) Foreign Application Priority Data
Dec. 16, 2009 (FR) ........................... 09 59069

(51) Int. Cl.
*B21F 15/06* (2006.01)
*B21F 23/00* (2006.01)
(Continued)

(52) U.S. Cl.
CPC ............... *C22C 47/068* (2013.01); *B21F 15/06* (2013.01); *B21F 23/005* (2013.01); *C22C 49/11* (2013.01);
(Continued)

(58) Field of Classification Search
CPC ......... B21C 47/18; B21F 15/06; B21F 15/08; B21F 15/10; B21F 19/00; B21F 23/005; B21F 27/10; B23K 2201/001; B23K 2201/22; B23K 2201/32; B32B 3/18; B32B 5/02; B32B 5/12; B32B 7/045; B32B 15/02; B32B 15/04; B32B 37/0076; B32B 37/0084; B32B 37/142; B32B 37/187; B32B 38/185; B32B 2250/20; B32B 2262/103; B32B 2262/105; B32B 2307/54; C22C 47/02; C22C 47/025; C22C 47/04; C22C 47/068; C22C 47/20; C22C 49/11; B23P 17/00; B22F 1/02; B22F 3/00; B22F 3/002; B22F 3/02; B22F 3/15
See application file for complete search history.

(56) References Cited

U.S. PATENT DOCUMENTS 4,492,265 A * 1/1985 Donomoto et al. ........... 164/493
4,681,151 A * 7/1987 Koya et al. ................... 164/76.1
(Continued)

FOREIGN PATENT DOCUMENTS

EP 1 726 677 11/2006
FR 2 919 284 1/2009
(Continued)

OTHER PUBLICATIONS

International Search Report Issued Feb. 14, 2011 in PCT/EP10/69738 Filed Dec. 15, 2010.

*Primary Examiner* — Alexander P Taousakis
*Assistant Examiner* — Matthew P Travers
(74) *Attorney, Agent, or Firm* — Oblon, McClelland, Maier & Neustadt, L.L.P.

(57) ABSTRACT

A method for manufacturing a straight insert intended to be incorporated in a metal container by HIC includes placing coated wires in a rectilinear juxtaposition over a predefined length in a straight gutter-shaped tool and joining the coated wires together. The insert includes a bundle of coated wires that are joined together and have a predefined length. The wires are made from metal-coated ceramic fibers.

13 Claims, 2 Drawing Sheets

(51) Int. Cl.
  *C22C 47/06* (2006.01)
  *C22C 49/11* (2006.01)
  *B21C 47/18* (2006.01)
  *B21F 15/08* (2006.01)
  *B21F 15/10* (2006.01)
  *B22F 3/00* (2006.01)
  *B22F 3/15* (2006.01)
  *B32B 5/12* (2006.01)
  *B32B 15/02* (2006.01)
  *B32B 37/00* (2006.01)
  *B32B 37/14* (2006.01)
  *C22C 47/20* (2006.01)

(52) U.S. Cl.
  CPC ............... *B21C 47/18* (2013.01); *B21F 15/08* (2013.01); *B21F 15/10* (2013.01); *B22F 3/002* (2013.01); *B22F 3/15* (2013.01); *B22F 2998/10* (2013.01); *B32B 5/12* (2013.01); *B32B 15/02* (2013.01); *B32B 37/0084* (2013.01); *B32B 37/142* (2013.01); *C22C 47/20* (2013.01)

(56) References Cited

U.S. PATENT DOCUMENTS

| | | | | |
|---|---|---|---|---|
| 5,427,304 | A | * | 6/1995 | Woods et al. .................. 228/190 |
| 6,416,876 | B1 | * | 7/2002 | Deve et al. .................. 428/539.5 |
| 7,507,935 | B2 | * | 3/2009 | Franchet et al. ......... 219/121.64 |
| 7,511,248 | B2 | * | 3/2009 | Franchet et al. ......... 219/121.64 |
| 2006/0024490 | A1 | * | 2/2006 | Werner et al. .................. 428/323 |
| 2007/0051455 | A1 | | 3/2007 | Franchet et al. |
| 2008/0030022 | A1 | * | 2/2008 | Twigg .......................... 285/21.1 |
| 2008/0210365 | A1 | * | 9/2008 | Franchet et al. .............. 156/169 |
| 2011/0005061 | A1 | | 1/2011 | Masson et al. |

FOREIGN PATENT DOCUMENTS

| | | |
|---|---|---|
| FR | 2 925 896 | 7/2009 |
| WO | 2010 001069 | 1/2010 |

\* cited by examiner

METHOD FOR MANUFACTURING A STRAIGHT INSERT MADE OF METAL MATRIX COMPOSITE MATERIAL

BACKGROUND OF THE INVENTION

1. Field of the Invention

The present invention relates to the field of metal matrix composite materials and relates more particularly to an insert made from ceramic fibers in a metal matrix to reinforce a metal part.

2. Description of the Related Art

In the field of aeronautics, in particular, it is a constant goal to optimize the strength of the parts for a minimum weight and size. Some parts may now comprise an insert made from a metal matrix composite material, hereinafter referred to as MMC, and the part may also be monolithic. Such a composite material comprises a metal alloy matrix, for example of titanium Ti alloy, within which fibers extend, for example ceramic fibers of silicon carbide SiC. Such fibers have a much higher tensile strength than that of titanium (typically 4000 MPa compared to 1000 MPa). Hence it is the fibers which absorb the stresses, while the metal alloy matrix acts as a binder with the rest of the part, and also protects and isolates the fibers, which must not be in contact with one another. Furthermore, ceramic fibers are erosion resistant, but must necessarily be reinforced with metal.

These composite materials can be used in the manufacture of disks, shafts, cylinder bodies, casings, spacers, as reinforcements of monolithic parts such as blades, etc.

For compressor disks in a turbine engine, for example, a known reinforcement technique consists in inserting a circular winding of coated fibers in the part. A technique for manufacturing an MMC insert is based on the principle of winding coated wires described in patent EP 1.726.677 filed in the name of Snecma. The insert is obtained from a plurality of coated wires each comprising a ceramic fiber embedded in a metal sheath. This type of wire is henceforth designated as coated wire. The manufacture comprises a step of winding a bundle or a joined layer of coated wires around a solid of revolution, perpendicular to the axis of the part. The insert is then subjected to a hot isostatic compression step in a container. The term container means a blank of a metal part in which a cavity is machined for accommodating the MMC insert, and which is then subjected to a hot isostatic compaction treatment. Said treatment is hereinafter referred to as HIC.

The parts described thus obtained are of the circular type and, in addition to compressor disks, are particularly suitable for the production of circular parts such as shafts, cylinder bodies or casings.

Other mechanical parts require different properties from those presented by the circular parts. This is the case in particular of the rods used, for example, in landing systems or structural parts such as engine suspensions, which are essentially oblong in shape. The function of these parts is to transmit a unidirectional tensile and/or compressive force. The reinforcement of these parts accordingly requires MMC inserts that are at least partly rectilinear. This is because the fibers must be oriented in the stress direction.

The industrial manufacture of these inserts at minimum cost is a delicate matter.

A method is known for fabricating a mechanical part comprising at least one insert of MMC material. The method comprises the fabrication of a draft insert by winding a bundle or a joined layer of coated wires around an annular support, part of which comprises a rectilinear portion.

The method described in patent FR 2.919.284 in the name of SNECMA and Messier-Dowty develops this principle and then comprises the insertion of the above-mentioned draft insert in a first metal container, the hot isostatic compaction of the first container, followed by the machining thereof to form a rectilinear insert element. After the manufacture of this insert element, the method for manufacturing a mechanical part comprises the following steps: insertion of the insert element into a second container, hot isostatic compaction of the second container and machining of the second container to form the desired mechanical part. The mechanical part thus obtained, for example a rod, can be used advantageously to transmit the unidirectional tensile and/or compressive forces in the direction of the ceramic fibers which have been incorporated therein.

Instead of passing through the intermediate step of compaction of the draft insert, followed by its cutting into rectilinear insert elements, it is feasible to cut the annular reel forming the draft by ensuring the holding of the coated wires in a bundle.

Patent application FR 2.925.896 teaches the incorporation of this type of bundle in a rectilinear groove terminating at its ends.

This solution has many drawbacks which impact the industrialization of these operations:

The coated wires are lost in the non-straight portions. This loss is not negligible because the coated semi-finished wire product represents a substantial share of the total cost of the part.

The winding, particularly on oval shapes, generates stresses in the wound insert that are liable to be released while causing a deformation of the insert during the cutting operation.

These techniques require a large number of systems for holding the coated wires at the cutting zones.

BRIEF SUMMARY OF THE INVENTION

It is the object of the present invention to develop a technique for producing straight inserts at reduced cost and readily suitable for industrial production.

This object is achieved with a method for manufacturing a straight insert intended to be incorporated in a metal container by means of HIC, said insert comprising a bundle of coated wires that are joined together and have a predefined length, characterized in that coated wires are placed in a rectilinear juxtaposition over a predefined length in a straight gutter-shaped tool, and the coated wires are joined together.

The inventive solution therefore serves to reduce the losses of coated wires on the one hand, and on the other hand at the industrial manufacture level, with high and automated production rates.

More particularly, the method consists of the formation of a stack of layers of rectilinear coated wires obtained by the flat juxtaposition of a predefined number of coated wires until a predefined number of layers is obtained, and in joining together the layers so that they are preferably held at the ends.

More particularly, a first layer is deposited on a planar surface, formed in particular of a metal sheet, the final layer of the stack is covered with another metal sheet and the assembly is joined together.

According to one embodiment, the layers are joined together by means of metal straps placed transversely along the stack of coated wires.

Preferably, the layers are formed from coated wires which are unwound from reels of wires, and advantageously, a layer is formed by simultaneously unwinding the wires of the layer from separate reels. The coated wires are then cut to said predefined length corresponding to the length of the bundle of coated wires of the insert.

According to an embodiment, the ends of the coated wires of a given layer are joined together after the formation thereof. The coated wires of a given layer are then cut, preferably together, to said predefined length.

The invention also relates to the method for manufacturing a metal part with at least one insert thus obtained. According to this method, At least one recess for an insert is machined in a metal body forming the container,
Said insert is placed in the recess,
A metal cover is placed on the body in order to cover the insert,
The cover is welded to the metal body,
The assembly of the metal body with cover is welded by hot isostatic compression and
Said treated assembly is machined to obtain said part.

BRIEF DESCRIPTION OF THE SEVERAL VIEWS OF THE DRAWINGS

The invention will be better understood and other objects, details, features and advantages thereof will appear more clearly from the detailed explanatory description that follows, of embodiments of the invention provided as purely illustrative and non-limiting examples, with reference to the appended schematic drawings.

In these drawings

DETAILED DESCRIPTION OF THE INVENTION

Figure 1:
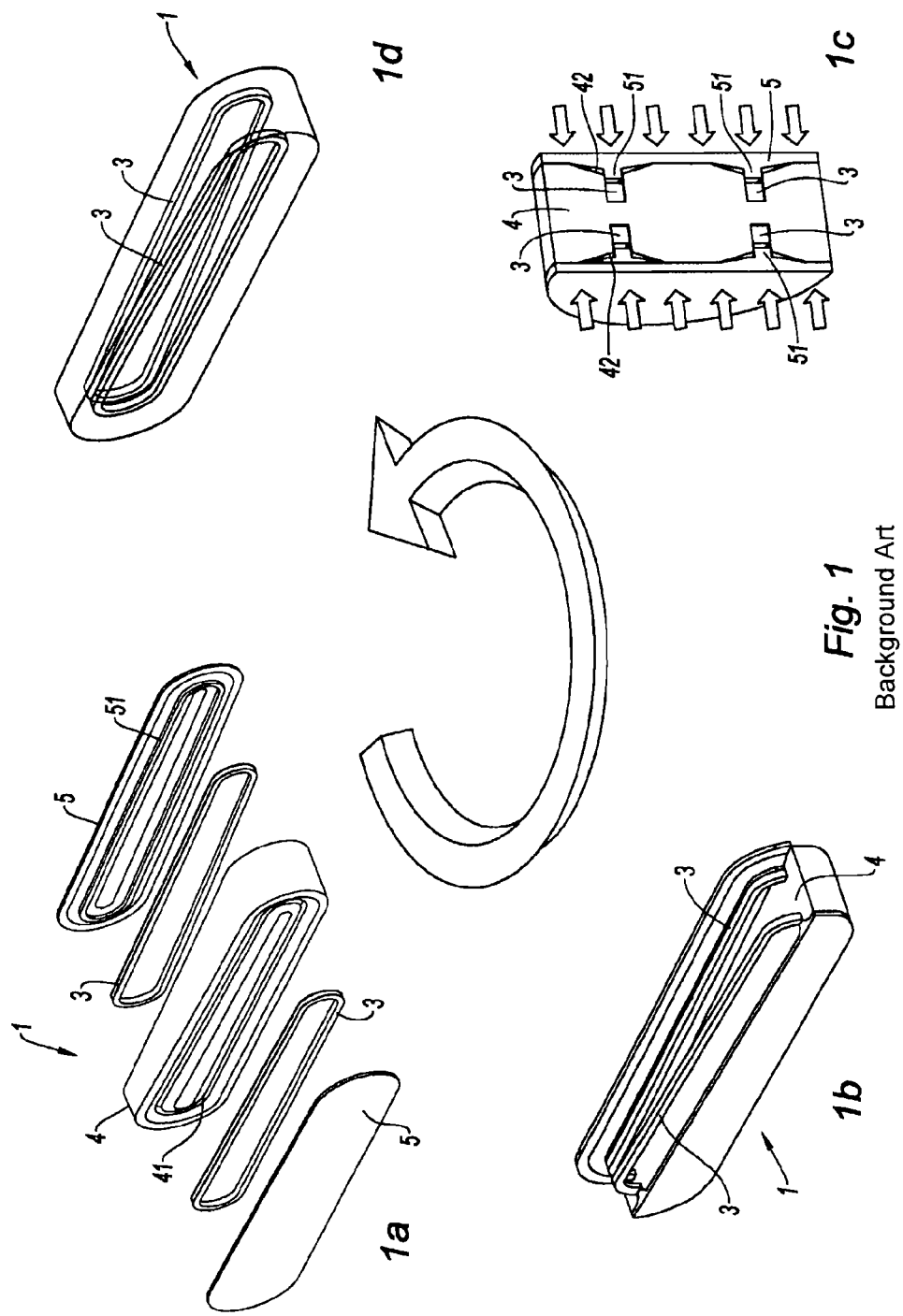
FIG. 1 shows the various steps 1a to 1d of the manufacture of a part having an elongated shape according to the prior art.

FIG. 1a, taken from patent application FR 2.919.284 in the names of Snecma and Messier-Dowty, shows a container 1 with an elongated main body 4 intended to form a rod of a landing gear, for example. A groove 41 has been machined on each of the two sides of the body 4. Said groove is used to accommodate an insert 3 which comprises two rectilinear portions that may or may not be parallel to one another joined at the ends by an arc of circle portion. The inserts are of the ceramic fiber type coated with metal such as titanium.

The grooves and the inserts have complementary shapes so that the insert fits snugly into the groove. It should be noted that the groove in the container and the tang on the cover must be perfectly joined to prevent the fibers, which have a very small diameter, of about 0.25 mm, from escaping during the hot isostatic compaction. Two covers 5 are provided with a projecting portion forming a tang 51 and cover the sides of the body 4. The tang bears against the insert accommodated in the groove and seals it in place. The cover 5 is welded to the body 4, for example by electron beam welding, providing the vacuum inside the container.

The container can be seen in FIG. 1b; this is a partial cutaway view to show the inserts. The container is then placed in a suitable chamber to undergo a hot isostatic compaction treatment therein. This treatment is aimed at joining together the container, its cover and the layers of coated wires, and thereby forming a monolithic part. The cross section of the container in FIG. 1c shows that the edges 42 of the groove 41 are chamfered in order to provide a clearance with the portion of the cover 5 that is adjacent to the tang 51. During the hot isostatic compaction operation, the pressure is applied along the direction perpendicular to the surface of the cover, causing the covers to collapse.

The pressure and heat, about 1000° C. and 1000 bar, respectively, enable the matrix metal to occupy the voids between the coated wires constituting the insert. The volume of the insert decreases by about 23%. The tang is thus displaced toward the bottom of the groove and the clearance on either side of the tang is absorbed. At the end of the process, the metal has fused and the container has compacted; the part is thus reinforced by the wires embedded in the mass.

FIG. 1d shows the blank part obtained with two inserts visible transparently. The blank is then machined in order to obtain the desired part. The ceramic fibers are thus incorporated in the branches of the part which ensure the transmission of the tensile and compressive forces.

The inserts used according to the teaching of this patent FR 2 919 283 have an annular shape but, as described in patent application FR 2 919 284, they may be formed of rectilinear rod elements. In the latter case, the rectilinear inserts are incorporated in the container by the technique described in this document, after having previously been compacted.

The production of the rectilinear inserts according to FR 2 919 284 comprises the winding of the coated wires around an annular-shaped reel device with rectilinear portions. The shape may be oblong, with rectilinear portions, or polygonal, in which the sides of the polygon constitute the rectilinear portions.

After formation of the winding of the wire or wires into a ring, the turns of the ring are immobilized together by means of welded metal straps. The assembly is incorporated in a container and undergoes a hot isostatic compaction treatment by the technique described above. Compact inserts of rectilinear shape are machined from the semi-finished part, and then individually incorporated in containers for the fabrication of parts with rectilinear ceramic fiber reinforcements.

According to the invention, the production of the inserts is simplified by forming the straight inserts 13l made directly from rectilinear coated wires 13 joined together in the manner of fasces or bundles.

Figure 2:
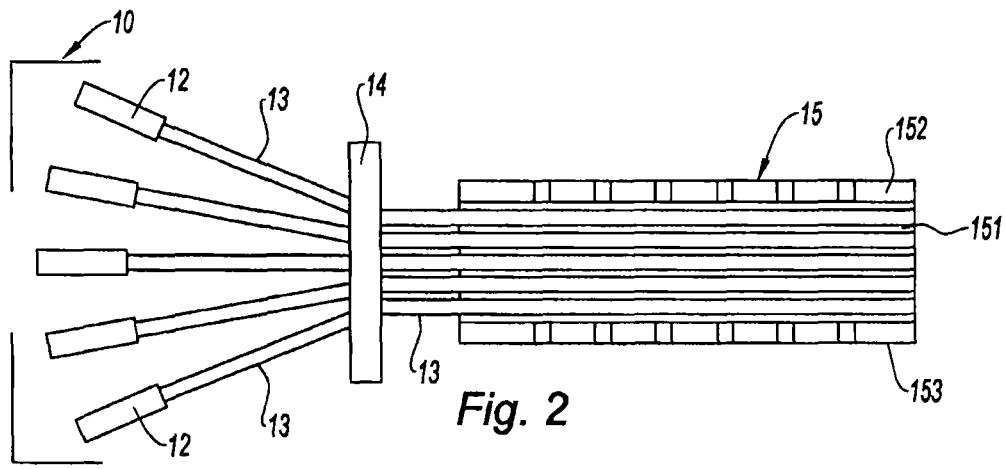
FIG. 2 shows a plan view of an installation for manufacturing a straight insert.

With reference to FIG. 2, an installation for implementing the inventive method comprises a payoff reel 10 supporting a plurality of reels 12 on which the coated wires 13 are wound. The coated wires are drawn from their respective reels by a twin roll system 14 toward which they converge. The system is formed of two rolls rotated about parallel axes; at least one of the rolls is the drive roll. The coated wires are placed in one layer, side by side, in the space provided between the two rolls 14 and constitute, at the outlet, a layer of juxtaposed coated wires 13, parallel to one another.

Immediately downstream of the rolls 14, the layer of wires is guided in a tool having the shape of a straight gutter 15 with a flat bottom 151 and two side panels 152 and 153 perpendicular to said bottom and comprising openwork zones 154. The length of the gutter-shaped tool 15 corresponds to the length of the insert 13i which is to be fabricated. The layer is drawn into the tool 15 over a length equivalent to the length of the desired insert 13i.

According to the embodiment shown in FIGS. 2 to 5, a thin metal foil or sheet 16 is placed on the bottom of the gutter-shaped tool 15 and the first layer rests on the foil. The width of the layer is the same as that of the foil. The foil metal is preferably the same as that of the metal part for which the insert is intended. It is, for example, a titanium alloy.

Figure 3:
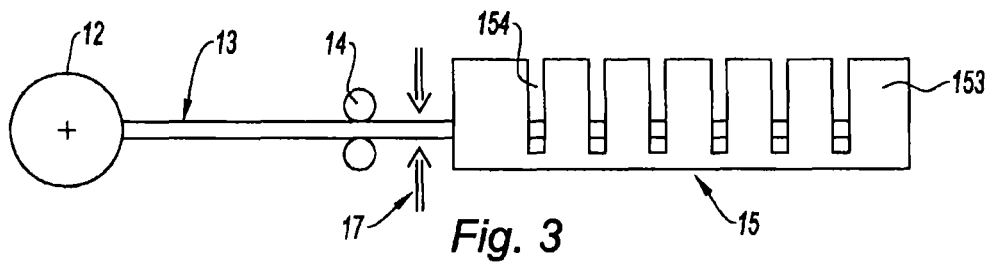
FIG. 3 shows the installation of FIG. 1, shown in profile.
Figure 4:
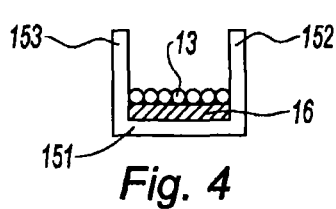
FIG. 4 shows the installation from the front, a first layer of coated wires having been placed in the bottom of the tool.
Figure 5:
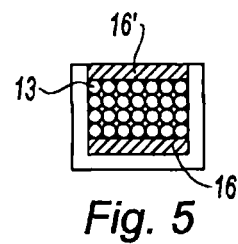
FIG. 5 shows the tool of FIG. 4, after being filled and the top metal foil put in place.

The number of wires in the layer is not limiting; it depends on the part to be fabricated, the representation in FIGS. 3 and 5 is simply indicative, and the diameter of the wires is not on the same scale as that of the gutter. The wires are juxtaposed in the layer without leaving any space between them.

According to a joining mode of the invention, the coated wires are attached to the foil 16, at the two ends of the gutter.

Two techniques are feasible, a mechanical means and a welding means. For the latter, the preferred means comprises a medium-frequency generator according to the teaching presented in the patent in the name of the applicant EP 1 726 677. This technique is recalled below.

In the case of a mechanical holding, an extra length is provided at the ends in order to be able to hold the layer. These extra lengths are cut and ultimately become scrap. This embodiment is not shown.

Depending on the desired length, intermediate holding points by welding are feasible.

The first layer thus attached to its support is cut at the gutter inlet by a suitable cutting means 17, such as a shear.

The layer, being held by the system of rolls 14, can again be pulled to constitute the next layer that is to be deposited on the first. The coated wires thus all have the same length.

The operation is repeated until the height reached corresponds to the dimensions of the desired insert 13*i*. At the end, a second foil 16' is placed on the top, see FIG. 5.

Figure 7:
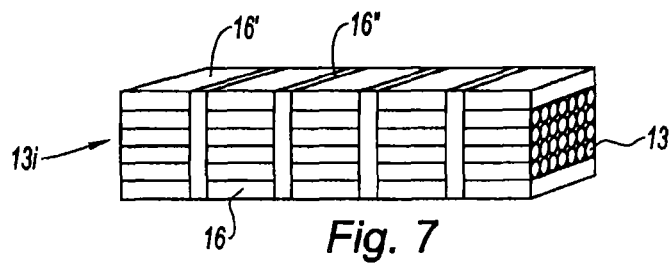
FIG. 7 shows a perspective view of an insert produced by the inventive method.

Small foils 16" forming straps are then positioned laterally at the openwork zones 154 of the tool 15 to hold the assembly together and prevent excessive bulking of the coated wires in the manner of staples surrounding the fasces of coated wires. The finished insert 13*i* is shown in FIG. 7.

In the case of mechanical holding at the ends, not shown, an additional end-cutting operation must be provided.

According to another embodiment, not shown, the layer of coated wires is held in place by welding at the ends, but also by weld lines along the insert. The subsequent layers are welded to the lower layer.

This embodiment avoids the need for mechanical systems for holding the ends, the top foil and the small side foils.

According to another embodiment, not shown, when permitted by the shape of the cavity of the container, the insert is formed directly in the container cavity. The first layer is held in place by welding at the ends but also, if necessary, by weld lines along the insert. The subsequent layers are welded to the lower layer. This configuration serves to eliminate the U tool and the various metal foils.

The present method is not limited to the production of square- or rectangular-section inserts. The method of fabrication by stacking layers of coated wires serves to produce trapezoidal cross sections by varying the width of the successive layers of coated wires.

The present method also allows the production of a plurality of inserts simultaneously, wherein the inserts are cut in the length of the "fasces" thus obtained.

Once the insert is completed, like the one shown in FIG. 7, it is incorporated in a metal container by the method known and described above to form a metal part.

According to a particular embodiment of the metal part, one of the foils is used both as a support and as a cover of the metal container in which the insert is placed. The cover is welded to the container while producing the vacuum in the part before the hot isostatic compaction treatment.

A method and a device are described below for the localized welding of a coated wire or of a joined layer or of a bundle of coated wires to a metal support. The support is presumed to be either a metal support in the strict sense of the term, in the present case the foil placed in the bottom of the gutter or the bottom of the gutter itself, or another coated wire or another layer or another bundle of coated wires.

This method and this device are suitable for joining the wire or the layer or the bundle to the support, while preserving the integrity of the ceramic fibers extending within the wire or wires. The method and the device also allow for the repair of the wires in case of breakage during a winding or a drape-forming process.

With reference to FIG. 5, the layer of coated wires 13 is to be joined to the support 16, at the ends of the layer. For this purpose, use is made of a device 20 for contact welding between two electrodes and the passage of a medium-frequency current. The coated wires 13 are shown in cross section here.

Figure 6:
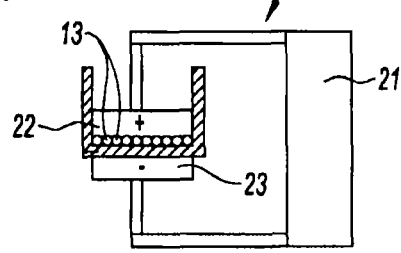
FIG. 6 shows a welding device for joining the coated wires to the underlying support.

The electrode welding device 20 comprises a medium-frequency generator 21, connected to a positive electrode 22 and a negative electrode 23. The welding device also comprises a module which controls the force applied to the electrodes. In the embodiment in FIG. 6, the positive electrode 22 and the negative electrode 23 extend transversely to the layer of coated wires 13. Their cross-sectional shape is uniform over this entire width.

The positive electrode 22, which may for example be made from copper or tungsten, comprises a beveled end portion. This end portion is shaped so that the current lines converge at the maximum in order to pass along the narrowest possible line, or strip, of contact, between the positive electrode 22 and the layer of coated wires 13. This end portion is rounded in order to avoid shearing the coated wires, which could damage them. The radius of this end portion is selected so as to obtain the best possible convergence of the current lines, but without being too narrow, in order to avoid shearing the coated wires.

Such an arrangement of the electrodes ensures the subsequent welding of the layer of coated wires to the support consisting of the foil 16, along a very narrow strip. The current concentration is constant in this strip.

The electrode welding process has the particular feature of combining the heating of the metal of the layer of coated wires with a slight forging, obtained by pressurization by the electrodes. The power and the time of heating and pressurization are advantageously controlled to minimize the temperature rise of the metal, to obtain its forging, and thereby to execute a solid state weld.

The layer of coated wires is heated by the passage of the current between the positive electrode and the negative electrode, caused by the controlled current generated by the medium-frequency generator 21. The pressure on the layer is obtained here by pressurization by the positive electrode 22 which thereby performs a second function, as a press. The rounded shape of its end portion is extremely important for this function, because the coated wires of the layer must not be sheared.

The electrode welding process described here proceeds as follows. As already indicated, it is a solid state welding process. The positive electrode and the negative electrode are placed in contact, respectively, with the layer of coated wires and with the bottom surface of the gutter. In a first phase, only a pressure is applied to the coated wires, between the two electrodes. The pressure is raised to a value P1 preferably between 5 and 13 kg. The function of this "cold" pressurization phase is to ensure the proper contacting of the coated wires, both between one another and to the walls of their support. In the case of wires from two layers, all the wires concerned are contacted together (one layer of wires acting as a support for the other). This proper contacting guarantees a proper passage of the current during the next phase. The current is then raised to a value that is preferably between 500 and 1500 A. This causes the heating of the metal coating the ceramic fibers of the coated wires and the onset of the welding.

The pressure is then raised to a higher value in order to implement an additional forging of the coated wires of the layer. It is then returned to its initial value for the time required for the weld to cool.

The invention claimed is:

1. A method for manufacturing a straight insert intended to be incorporated in a metal container by HIC, said insert comprising a bundle of coated wires that are joined together and have a predefined length, said wires being made from metal-coated ceramic fibers, the method comprising, in order to obtain the bundle:
   placing coated wires in a rectilinear juxtaposition over a predefined length in a straight gutter-shaped tool including a flat bottom and two side panels; and
   joining the coated wires together;
   wherein the side panels have openwork zones, and wherein the wires are joined together by metal straps placed transversely along the bundle of coated wires, said metal straps being placed in the openwork zones.

2. The method as claimed in claim 1, further comprising:
   forming the bundle by forming a stack of layers of rectilinear coated wires each obtained by a flat juxtaposition of a predefined number of coated wires until a predefined number of layers is obtained; and
   joining together the layers so that they are held at least at the ends.

3. The method as claimed in claim 2, wherein a first layer is deposited on a metal sheet, the final layer of the stack is covered with a metal sheet and the assembly is joined together.

4. The method as claimed in claim 3, wherein the first and second metal sheets are joined to the first layer and the final layer by welding.

5. The method as claimed in claim 2, wherein the layers are joined together by metal straps placed transversely along the stack of coated wires.

6. The method as claimed in claim 2, wherein the layers are formed from coated wires which are unwound from reels of wires.

7. The method as claimed in claim 6, wherein at least one layer is formed by simultaneously unwinding the wires of the at least one layer from separate reels.

8. The method as claimed in claim 2, wherein the ends of the wires of a given layer are joined together after the formation thereof.

9. The method as claimed in claim 8, wherein the wires of a given layer are cut together to the length corresponding to the length of the bundle of wires of the insert.

10. The method as claimed in claim 1, wherein the coated wires are joined together by welding.

11. A method for manufacturing a metal part comprising:
   machining at least one recess for an insert in a metal container;
   manufacturing an insert by the method of claim 1;
   placing said insert in the recess;
   placing a metal cover on the container so as to cover the insert;
   welding the cover to the metal container;
   treating the assembly of the metal container with cover by hot isostatic compression; and
   machining said treated assembly to obtain said part.

12. A method for manufacturing a straight insert intended to be incorporated in a metal container by HIC, said insert comprising a bundle of coated wires that are joined together and have a predefined length, said wires being made from metal-coated ceramic fibers, the method comprising:
   providing a straight gutter-shaped tool including a flat bottom and two side panels;
   placing a first metal sheet on the bottom of the straight gutter-shaped tool;
   placing a first layer of coated wires in a rectilinear juxtaposition over a predefined length on the first metal sheet in the straight gutter-shaped tool, a width of the first layer of coated wires being equal to a width of the first metal sheet;
   forming a stack of layers of coated wires on top of the first layer of coated wires until a predefined number of layers is obtained, each layer of coated wires being formed by placing the coated wires of each layer in a rectilinear juxtaposition;
   placing a second metal sheet of top of a final layer of coated wires; and
   forming the straight insert by joining the coated wires together such that the layers of coated wires are held at least at ends thereof and the layers of coated wires are sandwiched between the first and second metal sheets; and
   removing the straight insert from the straight gutter-shaped tool,
   wherein the coated wires of each layer are placed in the rectilinear juxtaposition such that each layer is free of space between the coated wires.

13. The method as claimed in claim 12, wherein the side panels include openwork zones, and
   wherein the layers are joined together by metal straps placed transversely along the stack of coated wires, said metal straps being placed in the openwork zones.

* * * * *